UNITED STATES PATENT OFFICE.

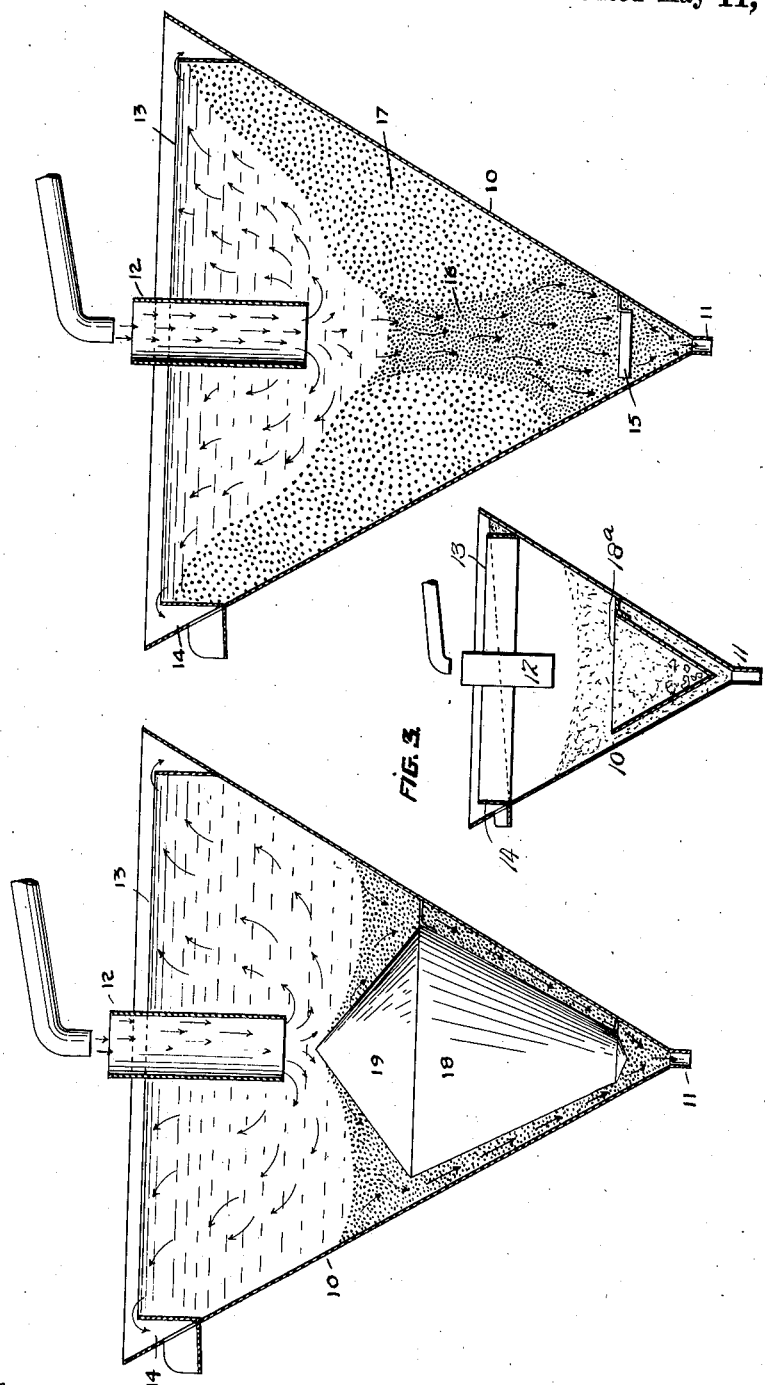

CHARLES ALLEN, OF EL PASO, TEXAS.

SETTLING-BASIN SEPARATING DEVICE.

1,339,682.  Specification of Letters Patent.  Patented May 11, 1920.

Application filed July 3, 1917. Serial No. 178,349.

*To all whom it may concern:*

Be it known that I, CHARLES ALLEN, a citizen of the United States, residing at El Paso, in the county of El Paso and State of Texas, have invented new and useful Improvements in Settling-Basin Separating Devices, of which the following is a specification.

This invention relates to classifiers or separators employing settling tanks in the shape of inverted cones having a discharge orifice at the bottom or apex.

In prior devices a thin disk or ball is used in the tank directly above the discharge orifice ostensibly for the purpose of preventing the downward flow of the contents from confining itself to a central restricted channel, which, however, fails to accomplish the desired purpose, for the reason that above the plate or ball the downward movement of the material is confined to a central channel of no greater area for a considerable portion of its length than the area of the plate or ball itself which is restricted on account of the fact that the plate or ball is disposed quite close to the apex of the tank. On the other hand, if the plate or ball be set any considerable distance above the discharge orifice in the tank a central restricted channel will form in the contents of the tank below the plate or ball. The formation of this restricted central channel results in the solids around it adhering to the sides of the tank where they either remain as a compact mass or fall off in slides, thereby causing a discharge through the orifice irregular both in volume and consistency. These defects, in operation, are so serious that they have even resulted in the rejection of cones as classifiers or de-waterers when the work was satisfactory in every other respect.

My present invention has for its object to prevent the formation of this restricted central channel through which the heavier particles in the tank pass on their way to the discharge orifice and also to overcome the adherence of solids to the sides of the tank. By repeated tests in regular mill work I have proved that all these defects are obviated when a certain portion of the interior of the cone is occupied for a considerable distance above the discharge orifice by a stationary filler. This filler may take a variety of forms, and in the accompanying drawings—

Figure 1 shows a vertical, central, sectional view of a cone-shaped settling tank embodying my invention.

Fig. 2 shows a vertical, central, sectional view of the same with a plate or baffle, such as is used in prior devices, substituted for my filler and illustrating the manner in which the solids cling to the sides of the tank and form the restricted central channel through which the downward flow takes place.

Fig. 3 is a vertical, central, sectional view of a cone-shaped settling tank embodying a modification of the invention.

Referring more in detail to the accompanying drawings, 10 indicates a cone-shaped settling tank, having a discharge orifice 11 at its bottom and receiving the material to be separated or classified through a nozzle 12. The lighter particles overflow the rim or lip 13 of the tank and enter a launder 14, while the heavier particles pass out through the orifice 11.

Fig. 2 shows a baffle plate 15 such as is ordinarily used in prior devices and also shows the approximate shape of the central restricted channel 16 formed in the settled contents of the cone and the shape of the compact mass 17 adhering to the sides of the tank.

In Fig. 1 I show the same cone with the lower central portion occupied by a filler 18 in the form of a pocket or stationary solid mass, in accordance with my invention, and illustrating the resulting form assumed by the settling solids on their way to the discharge orifice. These figures are drawn to correct proportions of a cone in actual daily use, and, when operated with a plate such as shown in Fig. 2, the settled solids assume the shape there shown and when operated with a filler, as shown in Fig. 1, the settled solids assume and maintain the shape and form shown in said Fig. 1, there being no compacted mass of settled solids nor flow toward the discharge orifice confined to a central channel in the last mentioned case. In fact, all of the previous defects in operation are eliminated by this simple device.

The filler 18 may be made with an open top, as shown at 18ª, so that it will fill with sand and form its own slope, or it may be made with a closed top 19, as shown in Fig. 1, or, if desired, it can be made solid throughout. In each case the result is a double cone and the apex of the upper cone is disposed above the level of the settled material which causes an equal distribution of the settling material toward the side walls of the tank, as clearly illustrated by Fig. 1. There is no exact area of the occupied space that will give the best results in every case, but there are certain proportions to be observed in any given case. The essential feature is the greater or less occupancy of the lower portion of the cone, more or less centrally thereof, by a suitable stationary filler, which portion of the cone if unoccupied by such filler becomes a detriment to the operation of the separator.

The thin plate or ball used in the prior devices occupies but a small space in the cone and for this reason it fails to prevent the formation of a central restricted channel and the adherence of the solids to the sides of the cone.

Also it is to be noted that the occupancy of a portion of the interior of the cone in accordance with my invention does not impair or decrease the capacity of the separator.

Various changes in the construction and arrangement herein shown and described may be employed without departing from the spirit of my invention as disclosed in the appended claims.

Having thus described my invention what I claim and desire to secure by Letters Patent is—

1. The method of preventing irregularity in the discharge of solid particles through the outlet orifice of a dewatering settler adapted to accumulate a substantial bulk of settled material which consists in filling the space centrally above the orifice and below the level of the settled material in a manner to leave an attenuated passage for the settling solids extending from and above the discharge orifice for an appreciable distance.

2. In a dewatering settler adapted to accumulate a substantial bulk of settled material, the combination with a settling tank having a discharge orifice at its base, of means below the level of the settling material to fill the space centrally above the orifice in a manner to form a substantially parallel-sided channel extending from and above the discharge orifice for an appreciable distance, whereby to prevent the formation of stationary plastic masses within the tank.

3. In a dewatering settler adapted to accumulate a substantial bulk of settled material, the combination with a settling tank having a discharge orifice at its base, of means below the level of the settling material to fill the space centrally above the orifice in a manner to form a substantially parallel-sided channel extending from and above the discharge orifice, for an appreciable distance, whereby to prevent the formation of stationary plastic masses within the tank, said filling means comprising a stationary, cone-shaped device spaced inwardly from the sides of the tank.

4. In a dewatering settler adapted to accumulate a substantial bulk of settled material, the combination with a settling tank having a discharge orifice at its base, of means below the level of the settling material to fill the space centrally above the orifice in a manner to form a substantially parallel-sided channel extending from and above the discharge orifice for an appreciable distance, whereby to prevent the formation of stationary plastic masses within the tank, said filling means comprising a stationary, open-topped, cone-shaped device spaced inwardly from the sides of the tank.

5. In a dewatering settler adapted to accommodate a substantial bulk of settled material, the combination with a settling tank having a discharge orifice at its base, of means within said tank for evenly distributing the settling material toward the side walls of the tank, said means extending for an appreciable distance throughout the settled material and restricting the downward flow thereof toward the orifice whereby a plastic formation of settled material above the orifice is prevented.

In testimony whereof I have hereunto set my hand in the presence of two subscribing witnesses.

CHARLES ALLEN.

Witnesses:
ELDRED S. ANSPACH,
W. O. MOORE.